D'ALEMBERT T. GALE.
Corn-Poppers.

No. 148,441.  Patented March 10, 1874.

Witnesses:
H. H. Dodge
J. C. Dowell

Inventor:
D. A. T. Gale
by Dodgeson
Attys.

UNITED STATES PATENT OFFICE.

D'ALEMBERT T. GALE, OF FORT WAYNE, INDIANA.

IMPROVEMENT IN CORN-POPPERS.

Specification forming part of Letters Patent No. 148,441, dated March 10, 1874; application filed June 18, 1873.

*To all whom it may concern:*

Be it known that I, D'ALEMBERT T. GALE, of Fort Wayne, in the county of Allen and State of Indiana, have invented certain Improvements in Corn - Poppers, of which the following is a specification:

My invention consists of an automatic or mechanical corn-popper for popping corn, and for keeping the same warm, as hereinafter more fully described.

Figure 1:
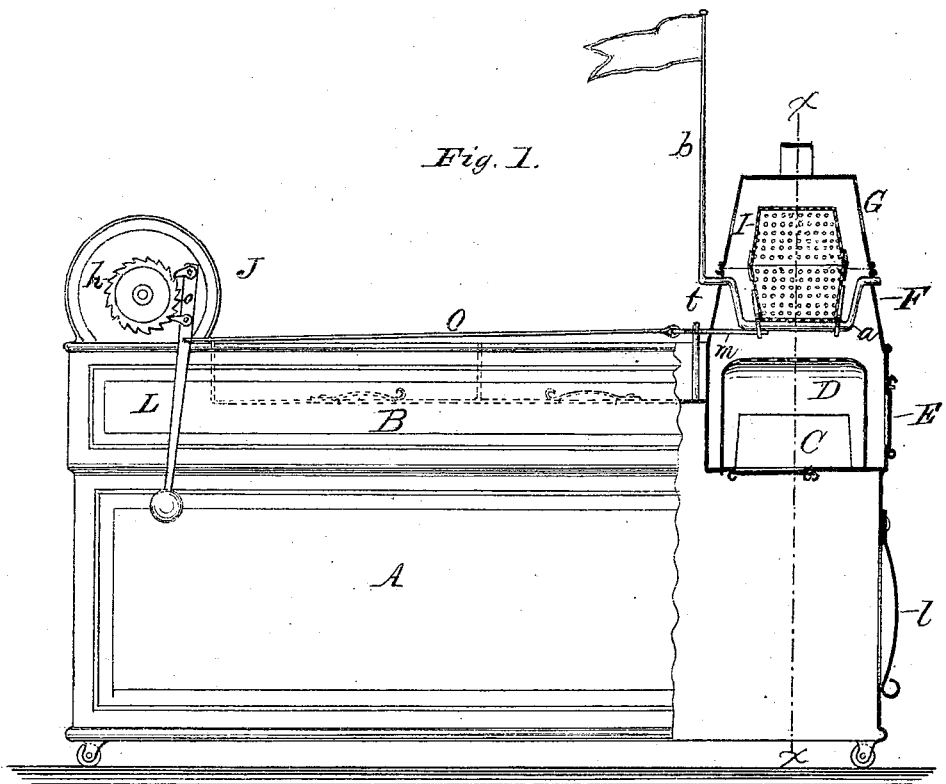
Figure 2:
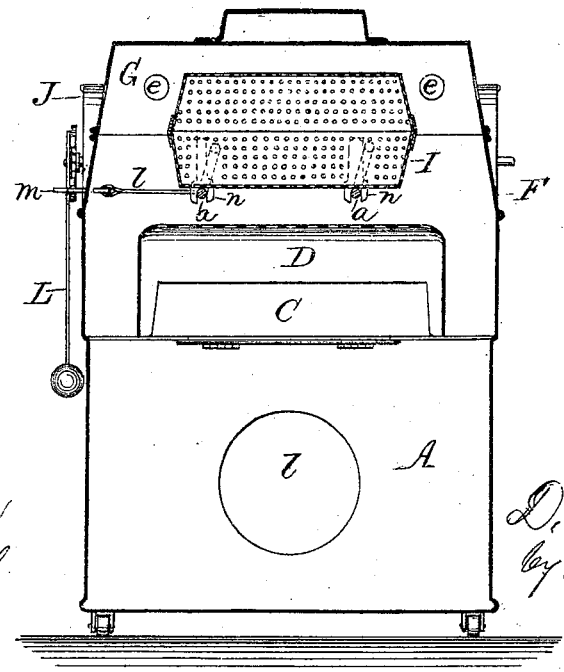

Figure 1 is a side elevation, with a portion shown in section; and Fig. 2 is a transverse vertical section on the line *x x* of Fig. 1.

In constructing my automatic popper I form the body A of galvanized or other sheet metal, of any required size and form, preferably rectangular in shape, and about two by four feet large. This body A is provided on top with two or more trays, a few inches deep, in which the corn is stored after being popped, and from which it can be taken, for sale, in any required quantity, the body under the trays being hollow, or having a flue underneath the trays for the admission of heat to them. At one end I construct a hopper, F, which has a detachable cover, G, which has a series of openings which may or may not be covered with isinglass or other transparent material, to permit the operator or attendant to see the operation within. In the bottom of this hopper I arrange a furnace or heating-chamber, *c*, in which may be located a charcoal fire, or gas-burners, or any equivalent means for producing the necessary heat; and directly over this, and between it and the popper-basket I, I arrange a deflector, D, as shown in Figs. 1 and 2, the object of which is to intercept any smoke or fumes that may arise from the burners or fire, and prevent them from coming in direct contact with the corn in the basket I. It also serves to prevent the heat from coming directly in contact with the corn, and thereby prevents it from scorching or burning it, as it otherwise would, when too intense. I then provide a popper-basket, I, which may be made of wire gauze or perforated sheet metal, with a lid or cover secured in any suitable manner. This basket I suspend in the upper part of the hopper F, as represented in Figs. 1 and 2. In order to impart to this basket the best motion for the purpose of shaking the corn placed therein, I mount it upon two rock-shafts, *a*, which are journaled at their opposite ends in the sides of the hopper F, as shown in Fig. 1, the basket I being provided with notched feet *n*, which rest upon and grasp the oscillating or swinging shafts *a*, as shown in Figs. 1 and 2, so that when they are moved the basket has imparted to it a reciprocating and slightly-rising movement, which I find to be the best movement for the purpose. Any other means of supporting or suspending the basket may be adopted, however, without changing materially its motions. As shown in Fig. 1, I attach to one of these rock-shafts, outside of the hopper, a standard, *b*, upon which may be secured a small banner or flag, having inscribed thereon the words "pop-corn" or any equivalent terms; or it may have connected to it a figure of a boy or girl so arranged as to represent the idea or operation of moving the basket.

To operate the basket, and keep it in motion, any suitable power may be used. In the drawing I have represented a cylinder or drum, J, on the end opposite the hopper, in which the operating mechanism may be secured, the same consisting of clock-work or gearing propelled by springs, weights, or any suitable means. Projecting from one end of this drum J is a shaft, on which is secured a ratchet-wheel, *h*, which, by means of pawls, operate a swing-lever or pendulum, L, as shown in Fig. 1. Connected to this lever L is a rod or pitman, O, which extends along the side of the body A, and is connected at its opposite end to an elbow-lever, *m*, which is connected, by a link, *l*, to one of the rock-shafts *a*, thus imparting motion to the rock-shafts and the basket I located thereon. These connections may, of course, be varied, according to circumstances, without affecting the result. It is obvious that the popper may be operated by foot or hand power, if desired, and produce the same results.

This apparatus not only saves labor in preparing the corn, but it is also very attractive, especially at fairs, and in public places and gatherings. It also enables a person to prepare a large quantity in a brief space of time, as is sometimes desirable, and also enables a person to prepare it speedily and fresh, instead of keeping a large supply on hand, which soon becomes stale or soiled.

I am aware that mechanism has been applied to rotate cylinders used for roasting nuts and coffee, and therefore I do not claim such a device; but I am not aware that a corn-popper has ever been devised in which a reciprocating basket or receptacle for the corn is operated by clock-work or any similar mechanism.

What I claim as my invention is—

1. A mechanical corn popper, consisting of a case or body, A, having a heater and a basket located therein, the latter being mounted or suspended on the rock-shafts $a\ a$, the whole being constructed and arranged to operate substantially as described.

2. A combined corn-popper and heater, consisting of a case having within it the reciprocating basket I, with a heater underneath, and a tray or counter for storing and keeping the corn warm after it has been popped, the whole constituting a complete portable apparatus, constructed and operating substantially as and for the purpose set forth.

D'ALEMBERT T. GALE.

Witnesses:
    J. McKENNEY,
    W. C. DODGE.